(12) United States Patent
Bhagavatula et al.

(10) Patent No.: US 9,350,819 B2
(45) Date of Patent: May 24, 2016

(54) CENTRALIZED SERVICE FOR DISTRIBUTED SERVICE DEPLOYMENTS

(75) Inventors: Girija Bhagavatula, Redmond, WA (US); Aidan Downes, Seattle, WA (US); Vadim Eydelman, Bellevue, WA (US); Neeraj Garg, Hyderabad (IN); Anand Lakshminarayanan, Redmond, WA (US); Bimal K. Mehta, Sammamish, WA (US); Deepak Rao, Bellevue, WA (US); Rahul Thatte, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 271 days.

(21) Appl. No.: 13/325,995

(22) Filed: Dec. 14, 2011

(65) Prior Publication Data

US 2013/0024690 A1 Jan. 24, 2013

Related U.S. Application Data

(60) Provisional application No. 61/510,435, filed on Jul. 21, 2011.

(51) Int. Cl.
*G06F 7/04* (2006.01)
*H04L 29/08* (2006.01)
*H04L 12/58* (2006.01)
*H04L 29/06* (2006.01)
*H04L 9/32* (2006.01)

(52) U.S. Cl.
CPC ............ *H04L 67/26* (2013.01); *H04L 12/5855* (2013.01); *H04L 67/28* (2013.01); *H04L 9/3268* (2013.01); *H04L 63/126* (2013.01); *H04L 67/2823* (2013.01); *H04L 2209/76* (2013.01)

(58) Field of Classification Search
CPC .................................. H04L 9/32; G06F 21/44
USPC ...................................................... 726/26–30
See application file for complete search history.

(56) References Cited

U.S. PATENT DOCUMENTS

| | | | |
|---|---|---|---|
| 7,864,716 B1 | 1/2011 | Manroa et al. | |
| 2004/0068665 A1* | 4/2004 | Fox ........................ | H04L 29/06 726/10 |
| 2004/0166834 A1* | 8/2004 | Omar .................. | G06F 17/3089 455/414.1 |
| 2004/0185888 A1 | 9/2004 | Serge | |
| 2007/0083675 A1 | 4/2007 | Vemulapelli et al. | |
| 2007/0136132 A1* | 6/2007 | Weiser ................... | G06Q 30/02 705/14.64 |
| 2008/0040441 A1 | 2/2008 | Maes | |

(Continued)

OTHER PUBLICATIONS

Ingle et al., "Push Technique Based Certificate Revocation Model for Mobile Devices," Computational Intelligence and Communication Networks (CICN), 2011 International Conference on Year: 2011 pp. 635-638.*

(Continued)

*Primary Examiner* — Roderick Tolentino
(74) *Attorney, Agent, or Firm* — Tom Wong; Micky Minhas

(57) ABSTRACT

A centralized service communicatively links an application provider to a plurality of different message forwarding services. The centralized service receives a request and authenticates the application provider associated with the request. Further, the centralized service delivers a message embodied by the request to a first message forwarding service with a first protocol and/or to a second message forwarding service with a second protocol different than the first protocol.

18 Claims, 5 Drawing Sheets

(56) References Cited

U.S. PATENT DOCUMENTS

| | | | |
|---|---|---|---|
| 2008/0127232 | A1 | 5/2008 | Langen et al. |
| 2008/0222263 | A1 | 9/2008 | Wu et al. |
| 2009/0234935 | A1* | 9/2009 | Watson .............. H04L 12/1822 709/219 |
| 2011/0103265 | A1 | 5/2011 | Dilipkumar Saklikar et al. |
| 2011/0223890 | A1* | 9/2011 | Patterson .............. G06Q 10/10 455/414.1 |
| 2011/0247082 | A1* | 10/2011 | Buchhop .............. G06Q 40/02 726/28 |
| 2011/0321024 | A1* | 12/2011 | Knothe .............. G06F 8/67 717/168 |
| 2012/0036220 | A1* | 2/2012 | Dare .............. G06F 8/61 709/217 |
| 2012/0110564 | A1* | 5/2012 | Ran .............. G06F 8/65 717/173 |
| 2012/0311046 | A1* | 12/2012 | Grigoriev .............. H04W 4/12 709/206 |

OTHER PUBLICATIONS

Maierhofer et al., "Extendable and Adaptive Message-Level Security Enforcement Framework," Networking and Services, 2006. ICNS '06. International conference on Year: 2006 pp. 72-72.*

Karmouch, et al., "Experimenting with Mobile Context-Aware SIP-based Multimedia Communications", Retrieved at <<http://ieeexplore.ieee.org/stamp/stamp.jsp?tp=&arnumber=4404160>>, First International Global Information Infrastructure Symposium (GIIS), Jul. 2-6, 2007, pp. 6-13.

Ohlmeier, Nils, "Design and Implementation of a High Availability SIP Server Architecture", Retrieved at <<http://www.ohlmeier.com/work/Des_Impl_HA_SIP_Arch.pdf>>, Jul. 9, 2003, pp. 106.

Ding, Kurt De, "Subscribing to Message Waiting Indicator or Using Exchange Web Services to Determine if a User has Voice Mail", Retrieved at <<http://msdn.microsoft.com/en-us/library/hh228133.aspx>>, Mar. 2011, pp. 7.

* cited by examiner

CENTRALIZED SERVICE FOR DISTRIBUTED SERVICE DEPLOYMENTS

CROSS REFERENCE TO RELATED APPLICATIONS

This application claims priority to U.S. Provisional Patent Application Ser. No. 61/510,435, filed Jul. 21, 2011, the entirety of which is hereby incorporated herein by reference.

BACKGROUND

Mobile application providers are continually developing applications for use on various computing devices. Often, it is desirable for the application provider to notify a user of an update, a new feature, a change in service, or other communication. To send a notification to the user, the application provider communicates with a message forwarding service to forward the notification to the computing device. However, there are various different types of computing devices and thus, various different types of message forwarding services that are each configured to communicate with a particular type of computing device using a particular message format and transport protocol. Further, each message forwarding service provides a certificate to verify a message for delivery to a particular type of computing device. This is overwhelming to an application provider, as the application provider needs to communicate with various message forwarding services to reach all their mobile customers. One approach to lessen the burden is to share certificates between all the application providers and message forwarding services. However, such an approach creates issues with security. Since the certificates are shared, a breech in security with one provider or service affects others in the shared community.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A centralized service for forwarding a message to be received by a user computing device is provided herein. According to one aspect of the disclosure, the service receives a request to forward a message from an application provider. The service packages a payload of the message in a particular format and sends the message using a particular transport protocol such that the message is received by a first message forwarding service and a second message forwarding service.

DETAILED DESCRIPTION

Technology has evolved to increasingly support a mobile computing environment. Users may accomplish virtually any task through interaction with a mobile computing device. For example, users may manage their voicemail, email accounts, bank accounts, etc. Generally, managing such accounts involves interaction with an application running on the mobile computing device, where each application is presented to the user as an interface for communicating with a remote service associated with that application. For example, a user may interact with her bank application to transfer funds between accounts. As such, a request to transfer funds may be sent to a bank service communicatively linked to the bank application.

In some scenarios, the user may subscribe to receive communications from a service. Such communications are often referred to as push notifications. Using push notifications, the service may notify the user of an update, a new feature, a change in service, or virtually any other information the service wishes to communicate. Since each customer of a given service may use a different type of computing device, push notifications may be formatted differently to accommodate each different type of computing device. As described further herein, a centralized service may be configured as a clearing house for managing push notifications. In this way, an application provider may communicate through one centralized service to reach each subscriber, and thus, each type of computing device.

Figure 1:
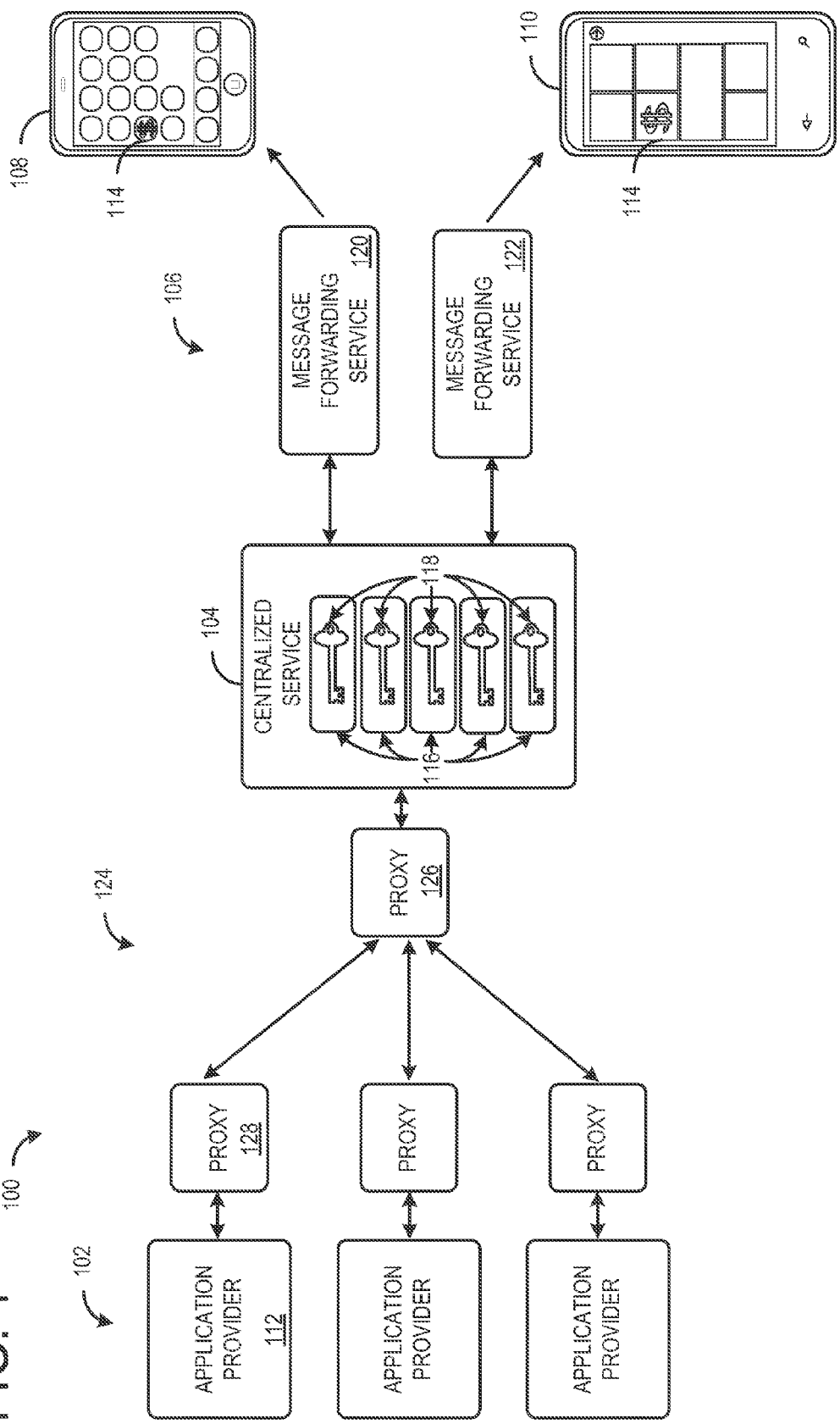
FIG. 1 schematically shows an example message forwarding environment according to an embodiment of the present disclosure.

FIG. 1 shows an example message forwarding environment 100. For example, message forwarding environment 100 may include any component involved in creating, forwarding, and/or receiving an electronic message such as a push notification. As shown, message forwarding environment 100 may include a plurality of application providers 102, a centralized service 104, a plurality of message forwarding services 106, and various different user computing devices such as first computing device 108, and second computing device 110.

Application providers 102 may provide various applications for use on computing devices. In general, an application provides an interface to a service for a user of a computing device. For example, an application provider 112 may be a financial service such as a bank, and the bank may develop an application 114 for their customers to have access to their banking accounts on their mobile computing devices; a service commonly referred to as mobile banking.

Each application provider 102 may include a server computing system that manages the particular service for deployment to the various different user computing devices. In some scenarios, an application provider may wish to notify a subscriber of an update, as introduced above. Returning to the banking example, a bank may wish to notify a mobile banking customer that their account balance is low, for example. Therefore, the bank server may create a push notification to be forwarded to the banking application 114 operating on the subscriber's mobile computing device—i.e., first computing device 108.

It will be appreciated that each application provider 102 may be configured to send push notifications to customers that subscribe to receive push notifications. Therefore, users of the mobile application may or may not elect to receive push notifications. Further, users may elect to conditionally receive push notifications. A user may subscribe to receive push notifications at any suitable time. Further, it will be understood that a user may cancel or change a subscription at any suitable time.

Centralized service 104 may be a clearing house configured to accept a push notification request from any cooperating application provider and process the request such that it may be received by any cooperating message forwarding service. Centralized service 104 may include a server computing system.

Centralized service 104 may hold a plurality of different cryptographic digital certificates 116 and associated cryptographic keys 118. Certificates 116 and keys 118 may be used to authenticate an application provider upon receipt of a request to communicate with the plurality of different message forwarding services. Further, certificates 116 and keys 118 may be used to authenticate a processed request (e.g., a push notification) with the message forwarding service for which the processed request is intended.

For example, centralized service 104 may authenticate each request individually using certificates 116 and keys 118. As another example, centralized service 104 may authenticate a batch of requests simultaneously, wherein the batch includes a plurality of requests from the same application provider. In this way, the batch of requests may be authenticated because a communication with that particular application provider has been authenticated using certificates 116 and keys 118. It will be appreciated that while the batch of requests may be from a single application provider, the batch may include requests that pertain to different applications. For example, the application provider may be a banking provider and the batch of requests may include a request to forward a banking application message and a request to forward an investment application message. In this example, the request to forward a banking application message and the request to forward an investment application message may be authenticated together, as a batch, because each request is received from the same application provider and the centralized service authenticates the connection with this particular application provider.

In this way, centralized service 104 serves as a translator such that a plurality of different application providers can communicate to a plurality of different message forwarding services. Since centralized service 104 holds the plurality of different cryptographic digital certificates 116 and associated cryptographic keys 118, an application provider is not overburdened with establishing a secure communicative pathway with the plurality of different message forwarding services. Further, centralized service 104 authenticates each application provider individually and is configured to package a message on behalf of the application provider such that the message may be received by any message forwarding service. In this way, centralized service 104 releases the application provider of the burden of establishing communication with the various different message forwarding systems. Therefore, the application provider can communicate with one centralized service using one message format and one transport protocol, and the centralized service forwards the content of that message in virtually any format and virtually any transport protocol, such that the message can be received by virtually any message forwarding service.

Previous solutions have shared certificates between all the application providers and message forwarding services. As another example, previous solutions have shared certificates between various deployments (e.g., service deployments) of an application provider. For example, continuing with the banking example, a national bank may provide a mobile banking application, yet each user of the banking application may connect to a deployment service of the national bank, such as a regional banking service, a local branch, etc. Since the certificate is shared with each service deployment, there is only one certificate to authenticate all the deployment services with a message forwarding service. Such an approach creates issues with security. Since the certificates are shared, a breech in security with one provider or service affects others in the shared community. Further, updating shared certificates is a timely process and requires coordination between the mobile client service and an administrator of each deployment. Shared certificates need to be updated in a shared location and then each administrator would have to obtain a new shared certificate and apply it to their deployment. Further still, since all deployments would use the same shared certificate to communicate with a Push Notification Service, identification of a rogue deployment becomes non-trivial.

As described in more detail below, centralized service 104 may be configured to format a message for a particular type of message forwarding service, where the format may be identified by the request. Additionally or alternatively, centralized service 104 may configure the message for a particular type of transport protocol identified by the request. In this way, centralized service 104 packages the message for delivery to a particular message forwarding service without changing a payload (e.g., content) of the message.

Further, centralized service 104 may be configured to send a response message to an application provider. As described in more detail below, the response message may report a status of the request to the application provider.

Message forwarding services 106 may be configured to receive a message, such as a push notification, from centralized service 104 and forward the message to a compatible computing device. For example, message forwarding service 120 may receive a message with a first format and/or according to a first transport protocol and forward the message to first computing device 108. As another example, message forwarding service 122 may receive a message with a second format and/or according to a second transport protocol and forward the message to second computing device 110.

It is to be understood that message forwarding services 120 and 122 may be configured to communicate with different types of computing devices. As such, message forwarding service 120 may be configured to communicate via a different format and/or different transport protocol than message forwarding service 122. As such, the first format may be different than the second format. Further, the first transport protocol may be different than the second transport protocol.

Further, it will be appreciated that message forwarding services may be a local service or a remote service. For example, the message forwarding services may be a module embodied by centralized service 104. As another example, the message forwarding services may include remote servers communicatively linked to centralized service 104 via a network.

First computing device 108 and second computing device 110 are different computing devices that may have different operating system. As such, each computing device may be configured to receive a particular type of message, which the other computing device may not be configured to process. In particular, each computing device may receive a message that includes similar content, but the format and/or protocol used to transmit the message to the computing device may be different.

Message forwarding environment 100 may optionally include one or more proxy servers 124. When included, a proxy server may be virtually any type of proxy server without departing from the scope of this disclosure. For example, proxy server 126 may be a reverse proxy server configured to manage and protect access to centralized service 104. As such, proxy server 126 may perform one or more various tasks such as load-balancing, authenticating, decrypting, caching, etc. In this way, proxy server 126 may enhance the efficiency of processing requests and/or responses while maintaining security and anonymity.

As another example, proxy server 128 may be a gateway proxy server, also known as a tunneling proxy server. As such, proxy server 128 may pass requests and/or responses without modifying the requests and/or responses. In this way, requests and/or responses may pass between application provider 102 and centralized service 104 without being modified and while maintaining security and anonymity.

Figure 2:
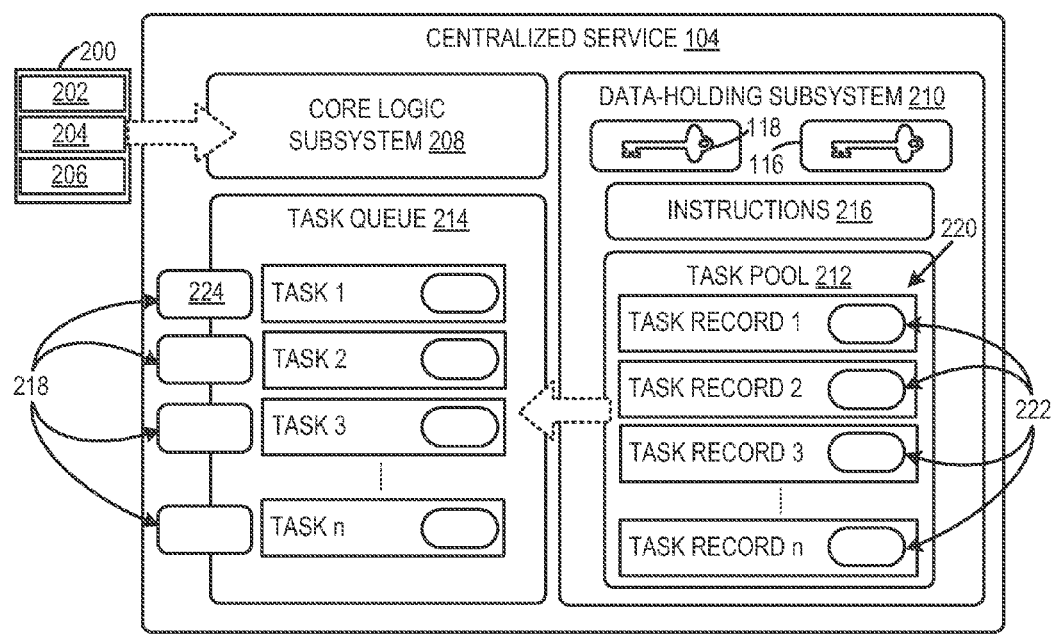
FIG. 2 schematically shows an example centralized service for distributed service deployments that may be included in the example environment of FIG. 1.

It will be appreciated that FIG. 1 is provided as an example, and as such is not meant to be limiting. Thus, message forwarding environment 100 may include additional and/or alternative features, aspects, components, etc. than those shown without departing from the scope of this disclosure. For example, it is to be understood that message forwarding environment 100 may include any number of different application providers, message forwarding services, and user computing devices, and not just the number of each shown in FIG. 1. Further, it is to be understood that the application providers and message forwarding services that centralized service 104 communicates with may or may not operate using different formats and protocols. In general, it will be appreciated that centralized service 104 may receive a push notification request from virtually any application provider and forward the push notification to virtually any message forwarding service without departing from the scope of this disclosure. FIG. 2 schematically shows various aspects of centralized service 104. Centralized service 104 may be configured to listen for an incoming request 200. For example, request 200 may be sent by an application provider using Session Initiation Protocol (SIP) federation. However, other communication pathways are possible without departing from the scope of this disclosure.

As shown, request 200 may include a provider identifier 202, a service identifier 204, and a payload 206. However, request 200 may include additional and/or alternative features than those shown without departing from the scope of this disclosure. For example, request 200 may further include an application identifier that identifies a particular application associated with the application provider. As such, an application provider may provide various different applications, and each application may be identified by a unique application identifier that distinguishes a particular application from another application of the same provider.

Provider identifier 202 may be used to verify the identity of request 200. In other words, the application provider associated with request 200 may be identified by provider identifier 202. Further, provider identifier 202 may be a globally unique identifier (GUID). The GUID may include any combination or subcombination of numbers, letters, symbols, characters, etc. of any suitable length. As one example, the GUID may be a 32-character hexadecimal string, which may be stored as a 128 bit integer. However it will be appreciated that other types of identifiers are possible without departing from the scope of this disclosure.

Service identifier 204 may identify a particular message forwarding service for which request 200 is intended. In other words, service identifier 204 may be associated with a particular type of computing device with which the particular message forwarding service is configured to communicate. Further, service identifier 204 may be a GUID, which is provided as one non-limiting example.

It will be appreciated that provider identifier 202 and service identifier 204 may be separate identifiers, or alternatively, may represent portions of a combined identifier. For example, provider identifier 202 may be a first portion of the combined identifier, and service identifier 204 may be a second portion to the combined identifier, wherein the first and second portions are combined in series. In this way, provider identifier 202 and service identifier 204 may together form a single identifier. Further, when included, the single identifier may include a third portion for an application identifier that identifies a particular application that may be included in the request.

Payload 206 may include a content of a message associated with the request. Continuing with the above banking example, payload 206 may include text such as 'your account balance is low,' for example. Payload 206 may also include other content such as a graphic, a link, an option to reply, etc.

As shown in FIG. 2, centralized service 104 may include a core logic subsystem 208, and a data-holding subsystem 210. Further, centralized service may include a task pool 212, and a task queue 214.

Briefly, core logic subsystem 208 may be configured to execute instructions 216 held by data-holding subsystem 210. As described in more detail below, instructions 216 may be executed to listen for an incoming request, validate the request, retrieve a corresponding task from a task pool, add the corresponding task to a task queue, and process the corresponding task, for example. Further, some portions of instructions 216 may be executed by core logic subsystem 208 and other portions of instructions 216 may be executed by a service specific logic subsystem 218. Core logic subsystem 208 and service specific logic subsystems 218 will be discussed in more detail below.

As shown, data-holding subsystem 210 may store one or more digital certificates 116 and associated cryptographic keys 118 that may be used to verify/authenticate incoming request 200 with centralized service 104 and/or verify/authenticate a processed request with a message forwarding service.

Further, data-holding subsystem 210 may include task pool 212 for storing a plurality of tasks 220. Task pool 212 may include a maximum number of tasks that a logic subsystem can execute to reduce the potential of a denial-of-service (DOS) attack, for example. Further, task pool 212 may be divided into subpools (not shown), wherein each subpool corresponds to a particular message forwarding service. For example, tasks may be saved to a subpool according to provider identifier 202 and/or service identifier 204. As such, tasks may be quickly called upon after identifying an incoming request and reused. In this way, task pool 212 may be organized to increase task processing efficiency.

Further, a connection object 222 may be associated with each task. The connection object may include data associated with establishing a connection with a particular message forwarding service. For example, each connection object 222 may include a digital certificate, a server identifier, a port identifier, a Uniform Resource Locator (URL), and/or other data that may be pertinent to establishing a connection with a particular message forwarding service. Further, connection objects 222 may be embedded within tasks 220. In this way, the connection object associated with a task can be reused and push notification requests can be continually processed and sent on established connections.

A task along with an embedded connection object may be transferred from task pool 212 to task queue 214 when the task is associated with the incoming request. The task may be added to the end of the task queue such that tasks are executed in the order that they are received, for example. As another example, the task may be added to the head of the task queue. Further, task queue 214 may optionally include subqueues (not shown) that organize tasks according to the associated message forwarding service, for example.

Each task in the task queue 214 may be picked up by a threadpool and executed by a logic subsystem. As one example, tasks may be executed by a particular service specific logic subsystem. Each task may be assigned to the particular service specific logic subsystem according to provider identifier 202 and/or service identifier 204. Service specific logic subsystems may be configured to process the assigned tasks. As such, the service specific logic subsystems may be configured to format the message to the appropriate format and send the formatted message to the appropriate message forwarding service using the appropriate transport protocol. As one example, specific logic subsystem 224 may format a message associated with 'Task 1' to an extensible markup language (XML) format and configure the message for agent transfer protocol (ATP) transport or transport via another suitable protocol.

Further, the service specific logic subsystems may be configured to send a response message to the application provider to indicate a status of the task. For example, the response message may indicate that the task has been completed and that the payload has been delivered to the appropriate message forwarding service. Accordingly, the service specific log subsystem may be configured to format the response message appropriately and send the response message using the appropriate transport protocol.

It will be appreciated that centralized service 104 may include additional and/or alternative components/modules than those illustrated in FIG. 2. In general, centralized service 104 is a computing device and may include one or more of the computing device components discussed with reference to FIG. 5 below.

Figure 3:
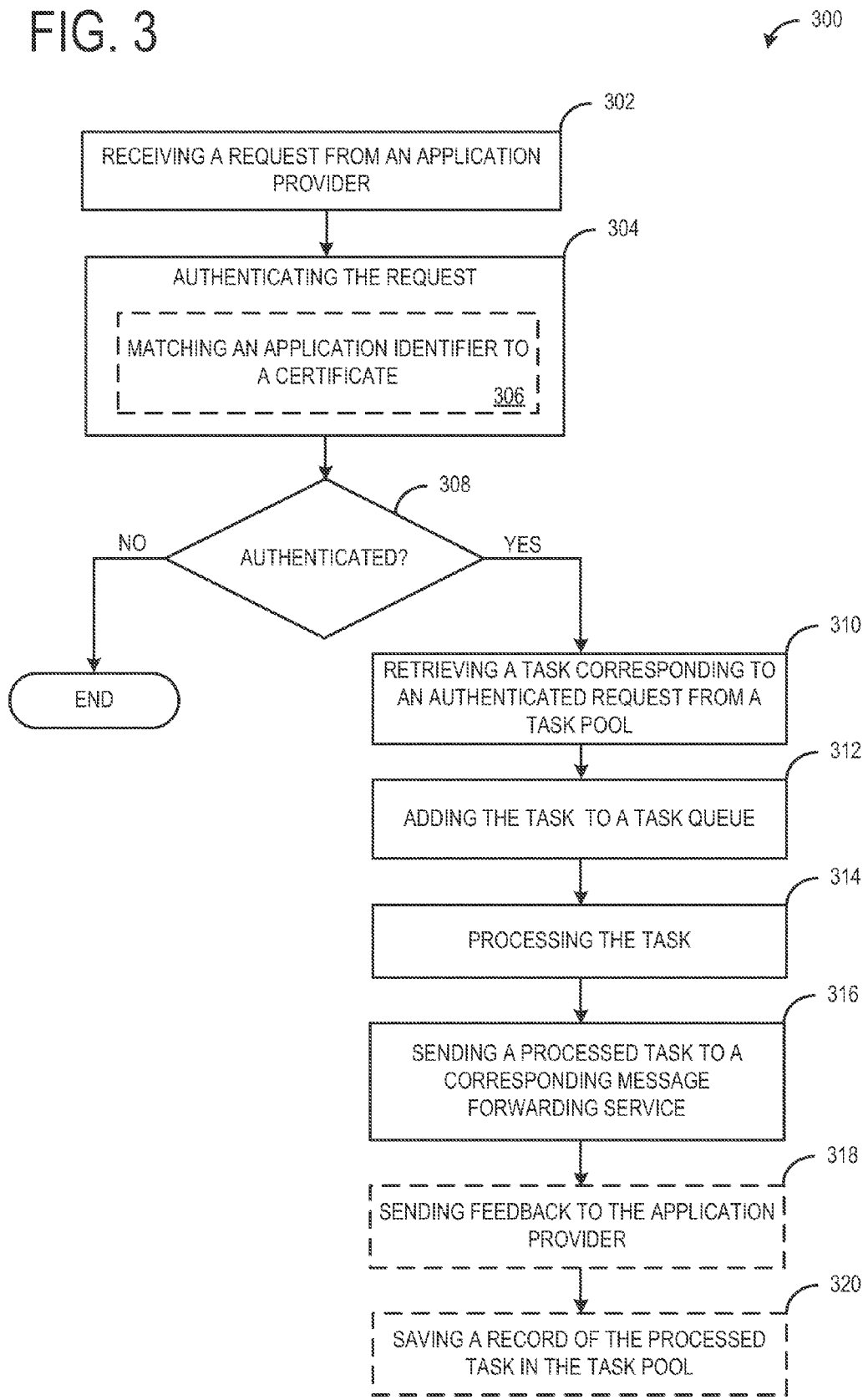
FIG. 3 illustrates an example method associated with the centralized service of FIG. 2.

FIG. 3 shows an example method 300 for processing a push notification request using centralized service 104. As described herein, method 300 may reference components of FIGS. 1 and 2.

At 302, method 300 includes receiving a request. For example, centralized service 104 may receive a request from an application provider to push a notification to a message forwarding service. It is to be noted that requests may be received from a variety of different application providers, each of which may be configured to send requests using different formats and/or protocols.

At 304, method 300 includes authenticating the request. For example, authenticating the request may include matching a provider identifier associated with the request to a specific digital certificate as indicated at 306. As such, the application provider that sent the request to the centralized service may be identified through the provider identifier. Further, the specific digital certificate may be accompanied by a cryptographic key that verifies the authenticity of the request.

It will be appreciated that use of a digital certificate and an accompanied cryptographic key is provided as one example of authenticating a request; and as such is not meant to be limiting. Thus, virtually any method of authentication is possible without departing from the scope of this disclosure.

At 308, method 300 determines if the request is authenticated. For example, the request may be authenticated as an individual request or as part of a batch of requests from the same application provider, as described above. If the answer to 308 is NO, method 300 ends. If the answer to 308 is YES, method 300 continues to 310.

At 310, method 300 includes retrieving a task corresponding to an authenticated request from a task pool. As described above, the task may be associated with an established connection with a particular message forwarding service. As such, the task may be saved for expeditious processing.

At 312, method 300 includes adding the task to a task queue. As described above, the task may be added to the end of the queue, or alternatively, the task may be placed at the beginning of the queue. It will be appreciated that the task may be placed in any suitable position within the queue.

At 314, method 300 includes processing the task. Processing the task may include matching a service identifier to a corresponding message forwarding service. As described above, there may be two or more different message forwarding services. It will be appreciated that each task may be processed individually, or alternatively, more than one task may be processed simultaneously, for example.

At 316, method 300 includes sending a processed task to the corresponding message forwarding service. For example, the processed task may be sent to MICROSOFT® Push Notification Service (MPNS) such that the payload of the request associated with the processed task is forwarded to an MPNS compatible mobile computing device (e.g., a WINDOWS® phone). As another example, a processed task may be sent to APPLE® Push Notification Service (APNS) such that the payload of the request associated with the processed task is forwarded to an APNS compatible mobile computing device (e.g., an IPHONE®).

At 318, method 300 may optionally include sending feedback to the application provider. For example, centralized service 104 may be configured to generate and send a response to the application provider that indicates a status of the request. As such, the response may include an indication that the request has been added to the task queue. As another example, centralized service 104 may be configured to forward a response from the message forwarding service to the application provider to indicate a status of the message.

At 320, method 300 may optionally include saving a record of the processed task in the task pool. In this way, centralized service 104 may reference the record if a future request is similar to the record in order to increase processing time efficiency, for example.

Further, the record may be called upon at predetermined intervals and transferred to the task pool to be re-processed periodically. For example, continuing with the banking example, a customer may subscribe to receive push notifications when a banking statement is available. As such, the customer may receive a similar push notification on a monthly basis, for example. Therefore, the centralized service 104 may save a record of the monthly push notification and reuse at least part of the record for processing the monthly push notification request when such a request is received.

It will be appreciated that method 300 is provided by way of example and may include additional and/or alternative steps than those shown in FIG. 3. Further, it will be appreciated that the steps may be performed in any suitable order. For example, a response may be generated and sent to the application provider to indicate the status of the request at each stage of the method in real-time. In other words, the application provider may receive a response when the request is authenticated, and further, the application provider may receive another response when the request is processed. As another example, the response may be generated and sent to the application provider after the task has been processed and sent. In this way, the application provider may receive a compiled response that includes information pertaining to each of the request processing steps, for example.

Figure 4:
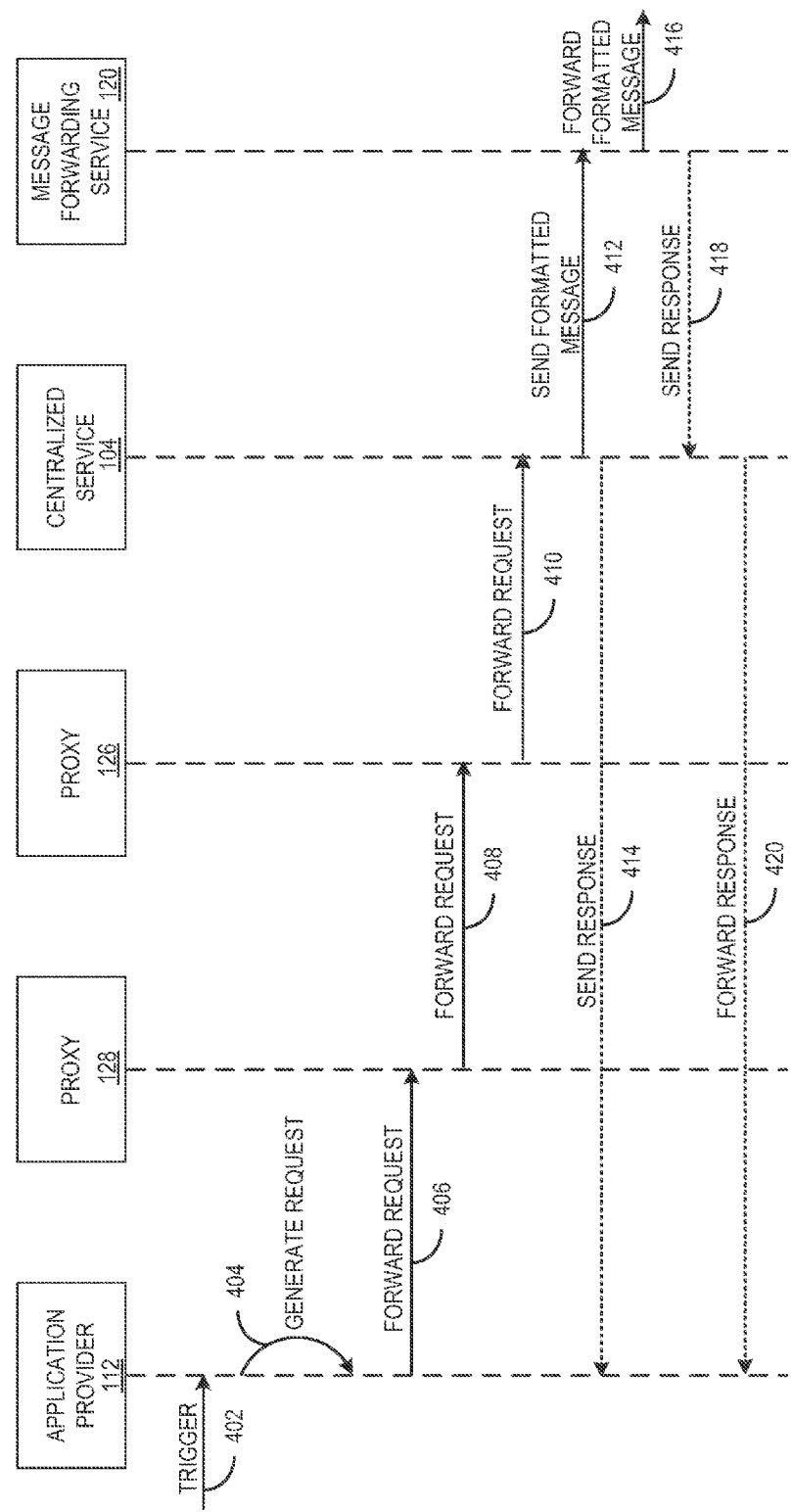
FIG. 4 schematically shows an example scenario associated with the example forwarding environment of FIG. 1.

FIG. 4 shows an example diagram 400 for the message forwarding environment 100 of FIG. 1. At 402, application provider 112 may detect a trigger event. For example, the trigger event may include a new push notification subscriber, a detected change to a subscriber's account, a change to an application service, etc.

At 404, application provider 112 may generate a request. The request may include payload associated with the trigger event and/or payload associated with the subscriber's account, for example.

At 406, application provider 112 may send the request to a proxy server 128. As one example, the request may be sent via SIP federation; however, other methods are possible without departing from the scope of this disclosure. Further, proxy server 128 may be a gateway proxy, and thus may forward the request without modifying the request, as described above.

At 408, proxy server 128 may forward the request to proxy server 126 using SIP federation. Proxy server 126 may be a reverse proxy associated with centralized service 104, as described above.

At 410, proxy server 126 may forward the request to centralized service 104 using SIP federation, for example. Proxy server 126 may forward the request such that it is unmodified, for example. Centralized service 104 may process the request as described above, for example, the message may be formatted for APNS.

At 412, centralized service 104 may send a formatted message associated with the request to a message forwarding service 120 using a transport protocol compatible with the message forwarding service. For example, the formatted message may be sent using Multiplexed Transport Layer Security (MTLS). Further, centralized service 104 may optionally send a response to application provider 112 indicating that the formatted message has been sent, as indicated at 414. Such a response may be sent using SIP federation, for example.

At 416, message forwarding service 120 may forward the formatted message to a corresponding computing device, for example. Further, message forwarding service 120 may optionally send a response to centralized service 104 indicating that the formatted message has been received and/or has been delivered to the computing device, as indicated at 418. Further still, centralized service 104 may forward such a response to application provider 112 using SIP federation, as indicated at 420.

It will be appreciated that FIG. 4 is provided by way of example and as such is not meant to be limiting. In general, diagram 400 provides example communication pathways between the various components of a messaging forwarding environment (e.g., message forwarding environment 100). Therefore, it is to be understood that other communication pathways may exist without departing from the scope of this disclosure.

Further, it will be appreciated that the behavior of the herein described centralized service and associated methods may be extended so that other interfaces, for example HTTPS, can be opened up for distributed server deployments.

Further, it is to be understood that push notifications are provided as an example, and thus are not meant to be limiting. The centralized service as described herein may be extended such that virtually any service may communicate with another service in any suitable fashion.

In some embodiments, the above described methods and processes may be tied to a computing system including one or more computers. In particular, the methods and processes described herein may be implemented as a computer application, computer service, computer API, computer library, and/or other computer program product.

Figure 5:
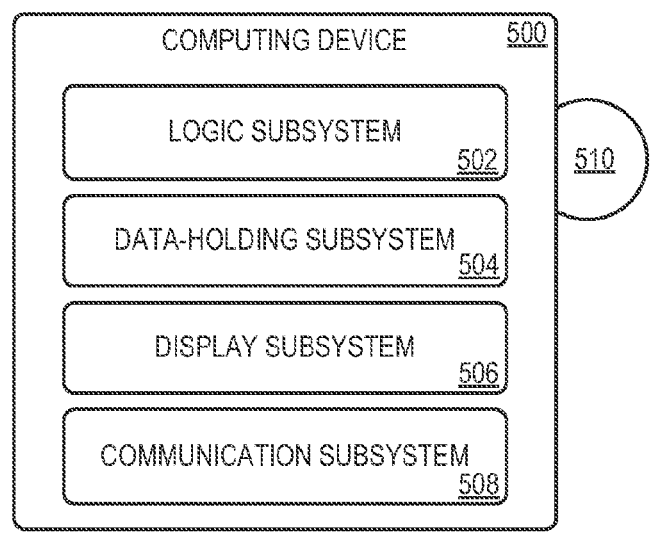
FIG. 5 schematically shows an example computing device that may be included in the message forwarding environment of FIG. 1.

FIG. 5 schematically shows a nonlimiting computing system 500 that may perform one or more of the above described methods and processes. Computing system 500 is shown in simplified form. It is to be understood that virtually any computer architecture may be used without departing from the scope of this disclosure. In different embodiments, computing system 500 may take the form of a mainframe computer, server computer, desktop computer, laptop computer, tablet computer, home entertainment computer, network computing device, mobile computing device, mobile communication device, gaming device, etc. Further, it will be appreciated that one or more of an application provider server, centralized service server, and a message forwarding service server as described herein, may be a computing system 500.

Computing system 500 includes a logic subsystem 502 and a data-holding subsystem 504. Logic subsystem 502 may be similar to core logic subsystem 208 and/or one or more of the service specific logic subsystems 218, for example. Data-holding subsystem 504 may be similar to data-holding subsystem 210, for example. Computing system 500 may optionally include a display subsystem 506, communication subsystem 508, and/or other components not shown in FIG. 5. Computing system 500 may also optionally include user input devices such as keyboards, mice, game controllers, cameras, microphones, and/or touch screens, for example.

Logic subsystem 502 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 504 may include one or more physical, non-transitory, devices configured to hold data and/or instructions executable by the logic subsystem to implement the herein described methods and processes. When such methods and processes are implemented, the state of data-holding subsystem 504 may be transformed (e.g., to hold different data).

Data-holding subsystem 504 may include removable media and/or built-in devices. Data-holding subsystem 504 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 504 may include devices with one or more of the following characteristics: volatile, nonvolatile, dynamic, static, read/ write, read-only, random access, sequential access, location addressable, file addressable, and content addressable. In some embodiments, logic subsystem 502 and data-holding subsystem 504 may be integrated into one or more common devices, such as an application specific integrated circuit or a system on a chip.

FIG. 5 also shows an aspect of the data-holding subsystem in the form of removable computer-readable storage media 510, which may be used to store and/or transfer data and/or instructions executable to implement the herein described methods and processes. Removable computer-readable storage media 510 may take the form of CDs, DVDs, HD-DVDs, Blu-Ray Discs, EEPROMs, and/or floppy disks, among others.

It is to be appreciated that data-holding subsystem 504 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system 500 that is implemented to perform one or more particular functions. In some cases, such a module, program, or engine may be instantiated via logic subsystem 502 executing instructions held by data-holding subsystem 504. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, display subsystem 506 may be used to present a visual representation of data held by data-holding subsystem 504. As the herein described methods and processes change the data held by the data-holding subsystem, and thus transform the state of the data-holding subsystem, the state of display subsystem 506 may likewise be transformed to visually represent changes in the underlying data. Display subsystem 506 may include one or more display devices utilizing virtually any type of technology. Such display devices may be combined with logic subsystem 502 and/or data-holding subsystem 504 in a shared enclosure, or such display devices may be peripheral display devices.

When included, communication subsystem 508 may be configured to communicatively couple computing system 500 with one or more other computing devices. Communication subsystem 506 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 500 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A centralized service for communicatively linking a plurality of application providers to different device-specific versions of a plurality of provider-specific applications via a plurality of different message forwarding services, the central service comprising:
a logic subsystem including one or more processor devices; and
a data-holding subsystem including one or more storage devices holding a plurality of digital certificates and associated cryptographic keys for authenticating requests, and the one or more storage devices holding instructions executable by the logic subsystem, the instructions including:
instructions to receive a request from a particular application provider of the plurality of application providers to communicate with a plurality of different device-specific versions of a particular provider-specific application provided by the particular application provider executing on different types of client computing devices via the plurality of different message forwarding services;
instructions to authenticate the request by matching the provider identifier to a digital certificate and a cryptographic key associated with its digital certificate;
instructions to authenticate the request by matching the application identifier to a digital certificate and a cryptographic key associated with its digital certificate;
and instructions to deliver, responsive to the request being authenticated, a message embodied by the request to one or more of the plurality of different device-specific versions of the particular provider-specific application via one or more different message forwarding services identified by the request, wherein the message is delivered to a first of the plurality of different message forwarding services arranged to deliver the message to a first device-specific version of the particular provider-specific application executing on a first type of computing device using a first protocol and to a second of the plurality of different message forwarding services arranged to deliver the message to a second device-specific version of the particular provider-specific application executing on a second type of computing device using a second protocol that is different than the first protocol.

2. The centralized service of claim 1, wherein each application provider of the plurality of application providers is configured to identify the first or second of the plurality of different message forwarding services as an intended message forwarding service.

3. The centralized service of claim 2, wherein a service identifier embodied by the request identifies the intended message forwarding service.

4. The centralized service of claim 1, wherein the plurality of different message forwarding services are remote services, and wherein the remote services forward the message to a particular mobile computing device.

5. The centralized service of claim 1, wherein the plurality of different message forwarding services are local services, and wherein the local services forward the message to a particular mobile computing device.

6. The centralized service of claim 1, wherein the message is a push notification message.

7. A method for a computing device to process a push notification, the method comprising:
receiving a request from an application provider to push a push notification to a plurality of different device-specific versions of a provider-specific application executing on different types of computing devices, the application provider being one of a plurality of different application providers for which the computing device is configured to receive the request, each of the plurality of different application providers associated with a provider identifier and a corresponding digital certificate;
authenticating the request by matching the provider identifier to a digital certificate and a cryptographic key associated with its digital certificate and by matching an application identifier to a digital certificate and a cryptographic key associated with its digital certificate;
processing an authenticated request to create a formatted push notification; and
sending the formatted push notification to a corresponding device-specific version of the provider-specific application via a corresponding message forwarding service, the corresponding message forwarding service being one of a plurality of different message forwarding services, one or more of the plurality of different message forwarding services being configured to push the formatted push notification using a different format or a different transport protocol than another of the plurality of different message forwarding services.

8. The method of claim 7, wherein the request includes a provider identifier, a service identifier, an application identifier, and a payload, and wherein the formatted push notification includes the payload unmodified from the request.

9. The method of claim 8, wherein authenticating the request includes matching the provider identifier associated with the request to a digital certificate, wherein the provider identifier identifies the application provider that sent the request.

10. The method of claim 9, wherein authenticating the request includes matching the application identifier associated with the request to a digital certificate, wherein the application identifier identifies a particular application associated with the request.

11. The method of claim 10, wherein the request is further authenticated via a cryptographic key that is associated with the digital certificate.

12. The method of claim 7, wherein processing the authenticated request includes retrieving a task corresponding to an authenticated request from a task pool, the task pool including a plurality of tasks stored within a data-holding subsystem of the computing device.

13. The method of claim 12, wherein each of the plurality of tasks further includes a connection object.

14. The method of claim 13, wherein the connection object includes data pertinent to establishing a communicative connection with the corresponding message forwarding service, the pertinent data including one or more of a digital certificate, a server identifier, a port identifier, and a uniform resource locator.

15. The method of claim 7, wherein processing the authenticated request further includes matching a service identifier of the request to the corresponding message forwarding service, wherein the service identifier indicates a particular format for the formatted push notification, the particular format compatible with the corresponding message forwarding service.

16. The method of claim 15, wherein the formatted push notification is sent to the corresponding message forwarding service using a particular transport protocol identified by the service identifier, the particular transport protocol compatible with the corresponding message forwarding service.

17. The method of claim 7, further comprising sending a response message to the application provider indicating a status of the request.

18. A system for authenticating a request for forwarding a push notification, the system comprising:
a logic subsystem including one or more processor devices; and
a data-holding subsystem including one or more storage devices holding instructions executable by the logic subsystem, the instructions including:
instructions to receive the request from an application provider to push a push notification to a plurality of different device-specific versions of a provider-specific application executing on different types of client computing devices, the request including a provider identifier, an application identifier, a service identifier, and a payload, the application provider being one of a plurality of different application providers for which the system is configured to receive the request;
instructions to authenticate the request by matching the provider identifier to a digital certificate and a cryptographic key associated with the digital certificate;
instructions to authenticate the request by matching the application identifier to a digital certificate and a cryptographic key associated with the digital certificate;
instructions to retrieve a task corresponding to the authenticated request from a task pool, wherein the task includes connection data that establishes a communicative connection with a message forwarding service;
instructions to add the task to a task queue;
instructions to process the task to create a push notification with a particular format identified by the service identifier; and
instructions to send the formatted push notification to a corresponding device-specific version of the provider-specific application via a corresponding message forwarding service using a particular transport protocol identified by the service identifier, wherein the formatted push notification includes the payload of the request, the corresponding message forwarding service being one of a plurality of different message forwarding services, one or more of the different message forwarding services being configured to push the formatted push notification using a different format or a different transport protocol than another of the plurality of different message forwarding services.

* * * * *